United States Patent [19]

Alper et al.

[11] Patent Number: 4,569,188
[45] Date of Patent: Feb. 11, 1986

[54] HARVESTING APPARATUS

[75] Inventors: Yekutiel Alper, Rishon le Zion; Yitzchak Sagi, Moshav Bitzaron; Gabi Michai, Ramat Hasharon; Aharon Antler, Tel Aviv; Yitzchak Elkin, Rehovot, all of Israel

[73] Assignee: State of Israel, Ministry of Agriculture, Israel

[21] Appl. No.: 330,582

[22] Filed: Dec. 14, 1981

[30] Foreign Application Priority Data

Sep. 14, 1981 [IL] Israel ........................................ 63819

[51] Int. Cl.⁴ ............................................. A01D 45/00
[52] U.S. Cl. .................................. 56/327 R; 56/16.5; 209/308; 209/920
[58] Field of Search ................... 56/327 R, 16.5, 16.4, 56/17.3; 130/30 C; 171/14, 124, 126, 127; 209/921, 920, 307, 308

[56] References Cited

U.S. PATENT DOCUMENTS

| | | | |
|---|---|---|---|
| 2,172,435 | 9/1939 | Cook | 171/127 |
| 2,468,639 | 4/1949 | Sample | 171/127 |
| 2,691,261 | 10/1954 | Poole | 171/127 |
| 3,070,944 | 1/1963 | Peto et al. | 56/327 R |
| 3,469,383 | 9/1969 | Maufre | 171/14 |
| 3,656,488 | 4/1972 | Damanowski et al. | 171/14 |
| 4,147,017 | 4/1979 | Cortopassi | 56/16.5 |
| 4,262,477 | 4/1981 | Turold et al. | 56/16.4 |
| 4,262,750 | 4/1981 | Merkley et al. | 56/16.5 |

Primary Examiner—Gene Mancene
Assistant Examiner—John G. Weiss
Attorney, Agent, or Firm—Cushman, Darby & Cushman

[57] ABSTRACT

Apparatus for harvesting delicate produce comprising a chassis arranged to be hitched to a tractor and driven thereby, plant pick-up and conveyor apparatus, apparatus for separating agricultural produce from plants, conveyor apparatus for receiving produce from the separating apparatus and moving it to one side thereof, sorting conveyor apparatus and produce loading conveyor apparatus.

13 Claims, 12 Drawing Figures

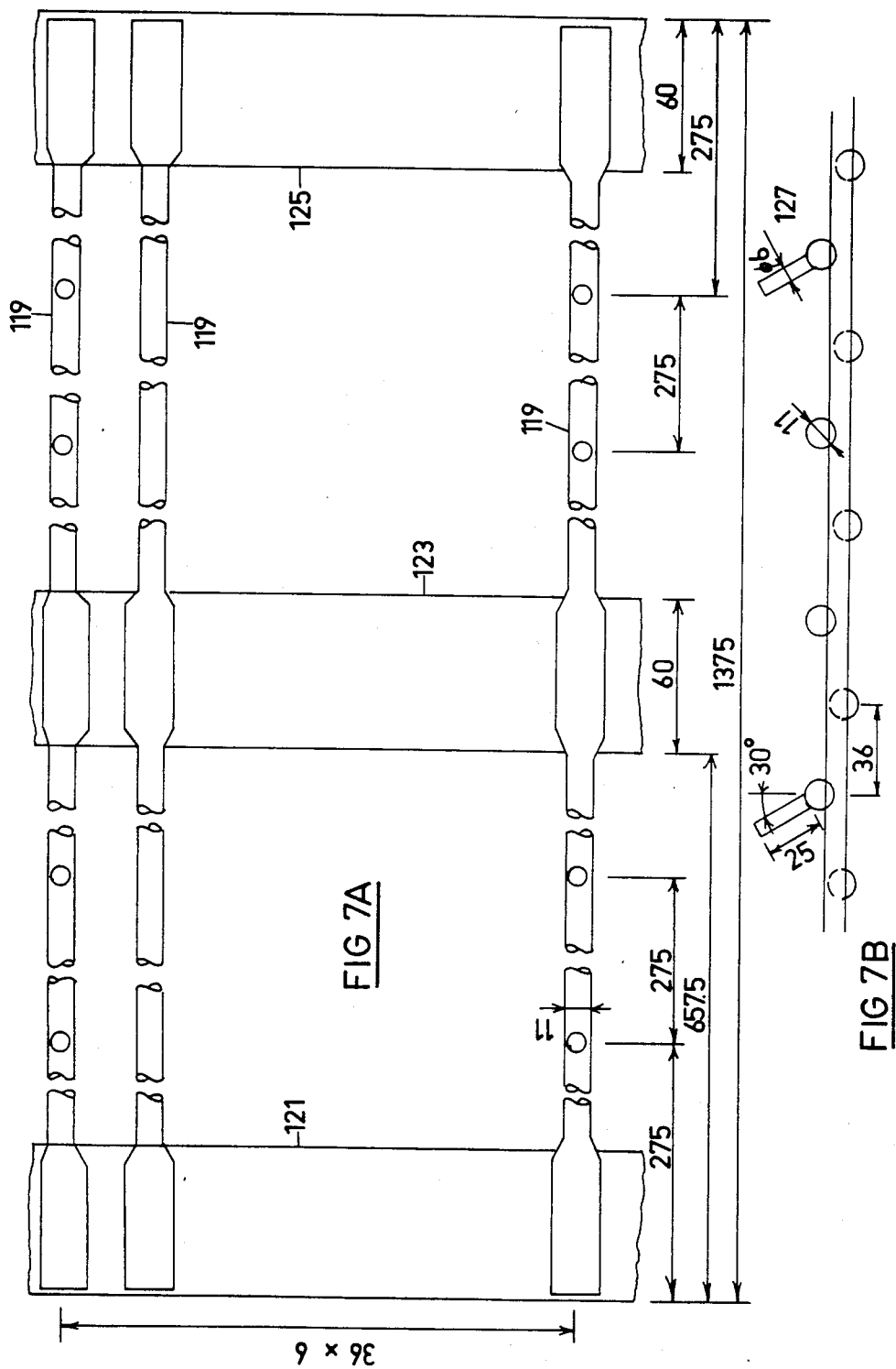

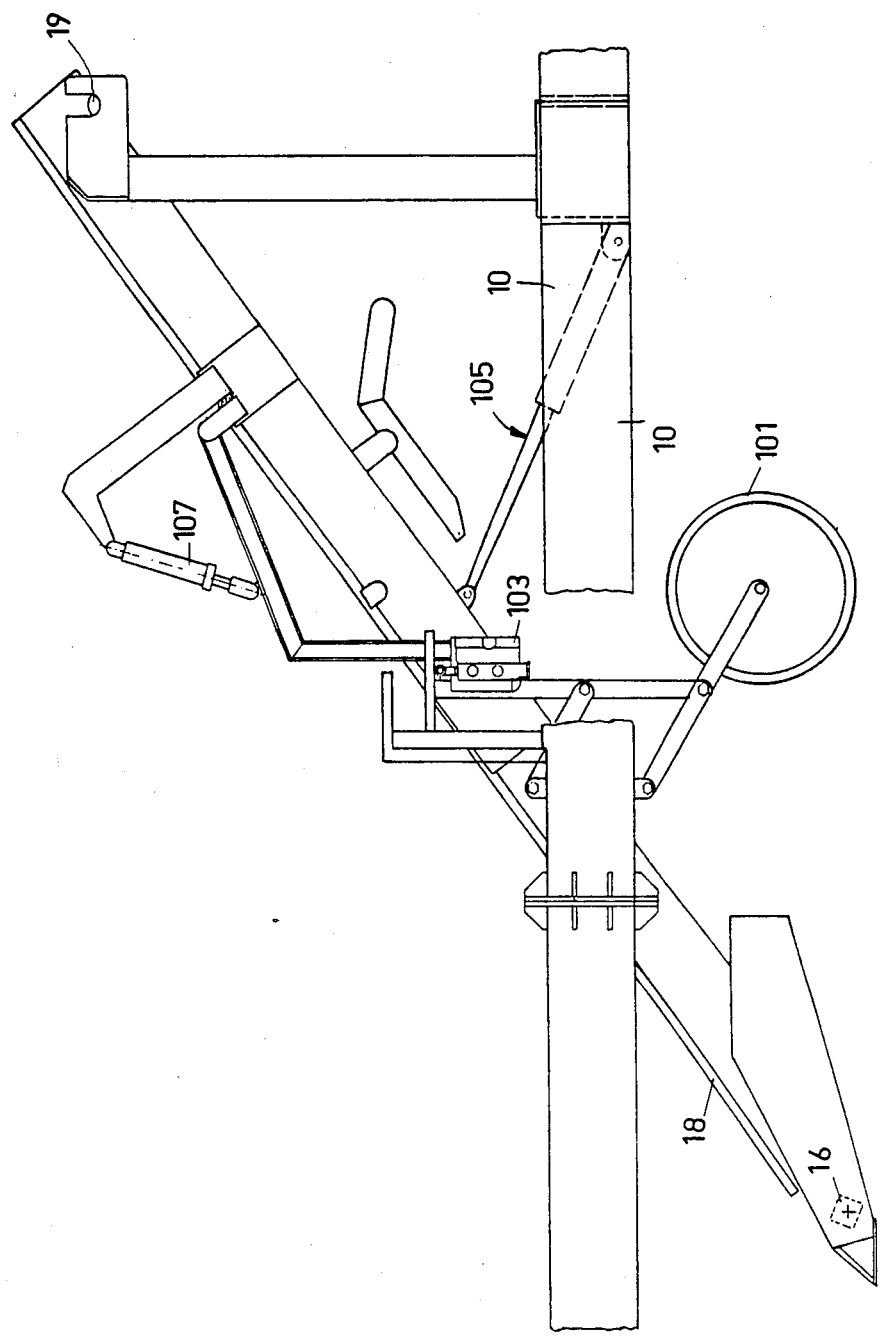

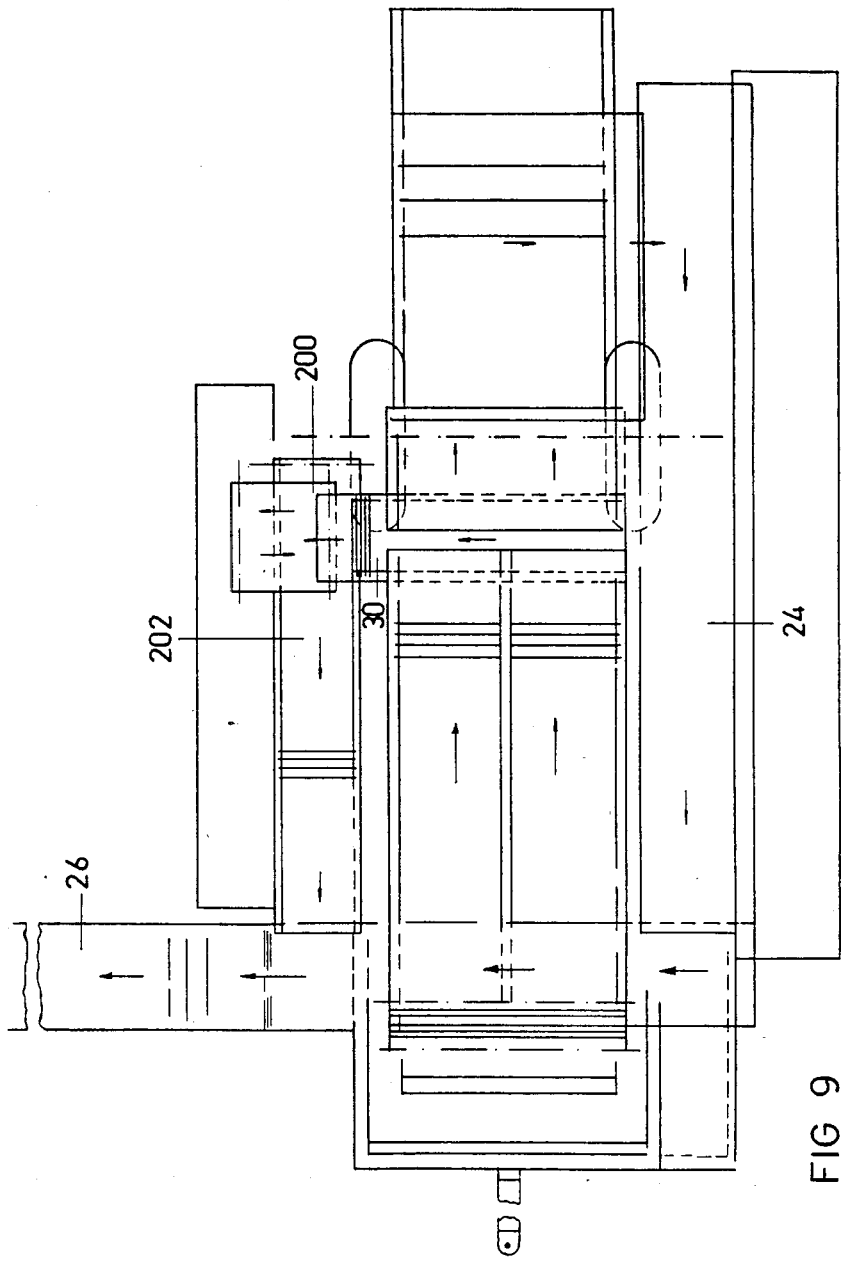

HARVESTING APPARATUS

The present invention relates to agricultural machinery generally and more particularly to harvesting or combine apparatus.

At present a large variety of vegetables, such as tomatoes, which are destined for fresh marketing, as distinct from industrial processing, are picked by hand, rather than machine. The requirement that such vegetables be hand picked adds significantly to the producer's costs due to the relatively high cost of labor and the wastage produced when the labor supply is insufficient during the harvest season.

Harvesting machines are known for tomatoes and other sensitive and delicate produce which is destined for later industrial processing. These are not suitable for use with produce destined to be marketed fresh since they produce excessive bruising of the produce during separation thereof from the remainder of the tomato plant.

Harvesting machines having shaking conveyors, herein termed "vibrating conveyors" having an amplitude in the range of about 10–20 cm, are known for separating produce from plants and vibrating conveyors arranged along an incline are also known for this purpose.

The present invention seeks to provide harvesting apparatus for delicate produce such as tomatoes, which is efficient, inexpensive and involves an acceptably low level of bruising to the produce.

There is thus provided in accordance with an embodiment of the present invention apparatus for harvesting delicate produce comprising a chassis arranged to be hitched to a tractor and driven thereby, plant pick-up and conveyor apparatus, apparatus for separating agricultural produce from plants, conveyor apparatus for receiving produce from the separating apparatus and moving it to one side thereof, sorting conveyor apparatus and produce loading conveyor apparatus.

Further in accordance with an embodiment of the present invention the plant pick-up and conveyor apparatus a pair of adjacent rods of rectangular cross section which engage the plants and assist in the separation thereof from the soil.

Additionally in accordance with an embodiment of the present invention, the plant pick-up and conveyor apparatus is inclined at an angle of 35° thereby to provide a compact apparatus.

Additionally in accordance with an embodiment of the invention, the conveyor apparatus may comprise rubber coated rods which may define an air cushion therewithin.

In the illustrated preferred embodiment of the invention all of the produce is moved to one side of the apparatus onto the sorting conveyor. The sorting conveyor is a generally level conveyor and extends to the produce loading conveyor apparatus.

Additionally in accordance with an embodiment of the invention the apparatus for separating produce from plants comprises an endless conveyor including a plurality of spaced support elements arranged to permit produce to pass therebetween; the conveyor defining a produce separation pathway and apparatus for driving the conveyor means in vibratory motion in a first direction along a first portion of the separation pathway and in a second direction, angled with respect to the first direction, along a second portion of the separation pathway, thereby to enhance separation of produce from the plants.

The present invention also seeks to provide apparatus for separating produce from plants which is highly efficient and provides a high quality of separation with an acceptably low level of bruising to the produce.

There is thus provided in accordance with an embodiment of the present invention apparatus for separating agricultural produce from plants comprising an endless conveyor including a plurality of spaced support elements arranged to permit produce to pass therebetween; the conveyor defining a produce separation pathway; apparatus for driving the conveyor in a first direction along a first portion of the separation pathway and in a second direction, angled with respect to the first direction along a second portion of the separation pathway; and apparatus for causing vibration of the endless conveyor.

Further in accordance with an embodiment of the present invention, there is provided apparatus for separating agricultural produce from plants comprising an endless conveyor defining a produce separation pathway; first apparatus for driving the conveyor in forward motion; and second apparatus for driving the conveyor in vibratory motion at a desired amplitude, the first and second apparatus being controllable independently of each other for providing selectable forward motion and selectable amplitude of vibration of the conveyor.

The apparatus for driving the conveyor may be continuous drive apparatus or alternatively may be pulsed drive apparatus which may be coordinated with the vibration of the conveyor.

The amplitude of vibration is typically between 10 and 20 cm.

BRIEF DESCRIPTION OF THE DRAWINGS

The invention will be more fully understood and appreciated from the following detailed description taken in conjunction with the drawing in which:

FIGS. 7A and 7B are illustrations of details of construction of an inclined pickup conveyor;

FIG. 8 is an illustration of automatic level maintenance apparatus associated with the inclined pickup conveyor; and FIG. 9 is a top view illustration of an alternative embodiment of the harvester in accordance with the present invention.

DETAILED DESCRIPTION OF THE INVENTION

The present invention will be described hereinafter in the context of a tomato harvesting machine. It is noted, however, that the structure of the present invention is not limited in its use to tomato harvesting but may be employed with suitable modifications for any type of agricultural produce for which it is appropriate.

Figure 1:
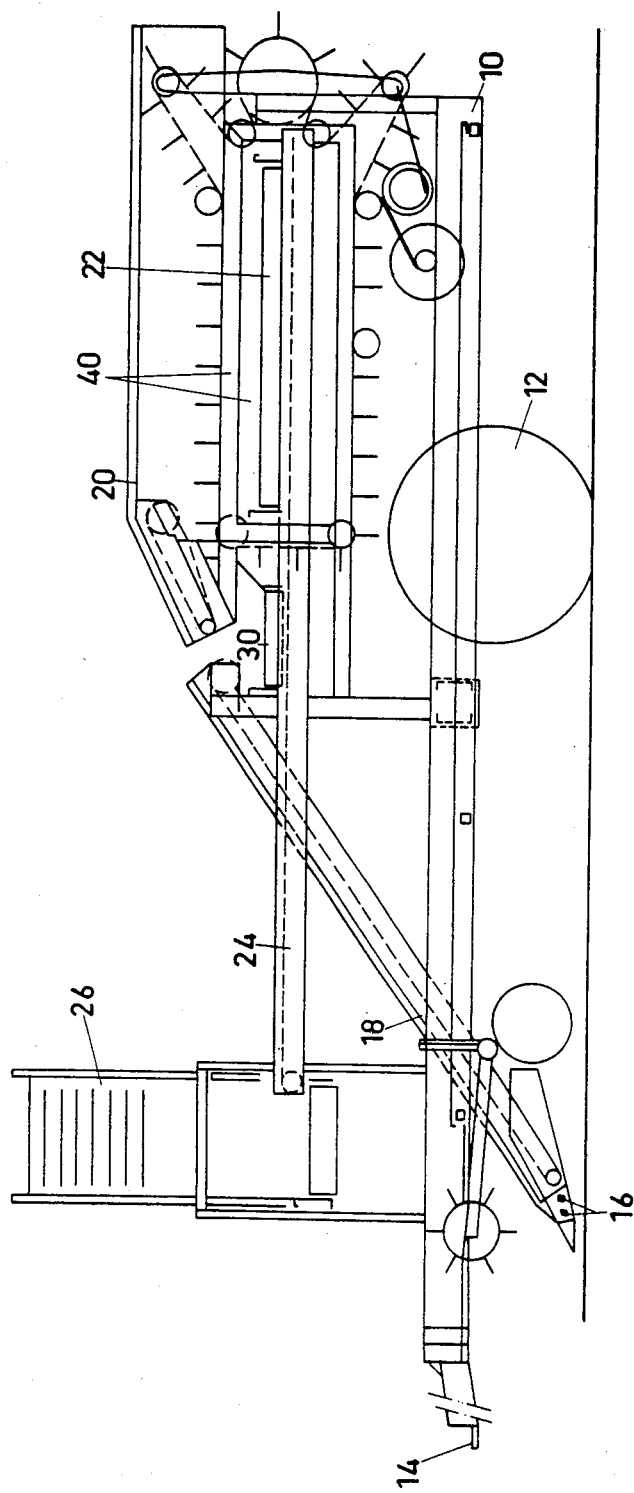
FIG. 1 is a sectional illustration of a tomato harvester constructed and operative in accordance with an embodiment of the present invention.
Figure 2:
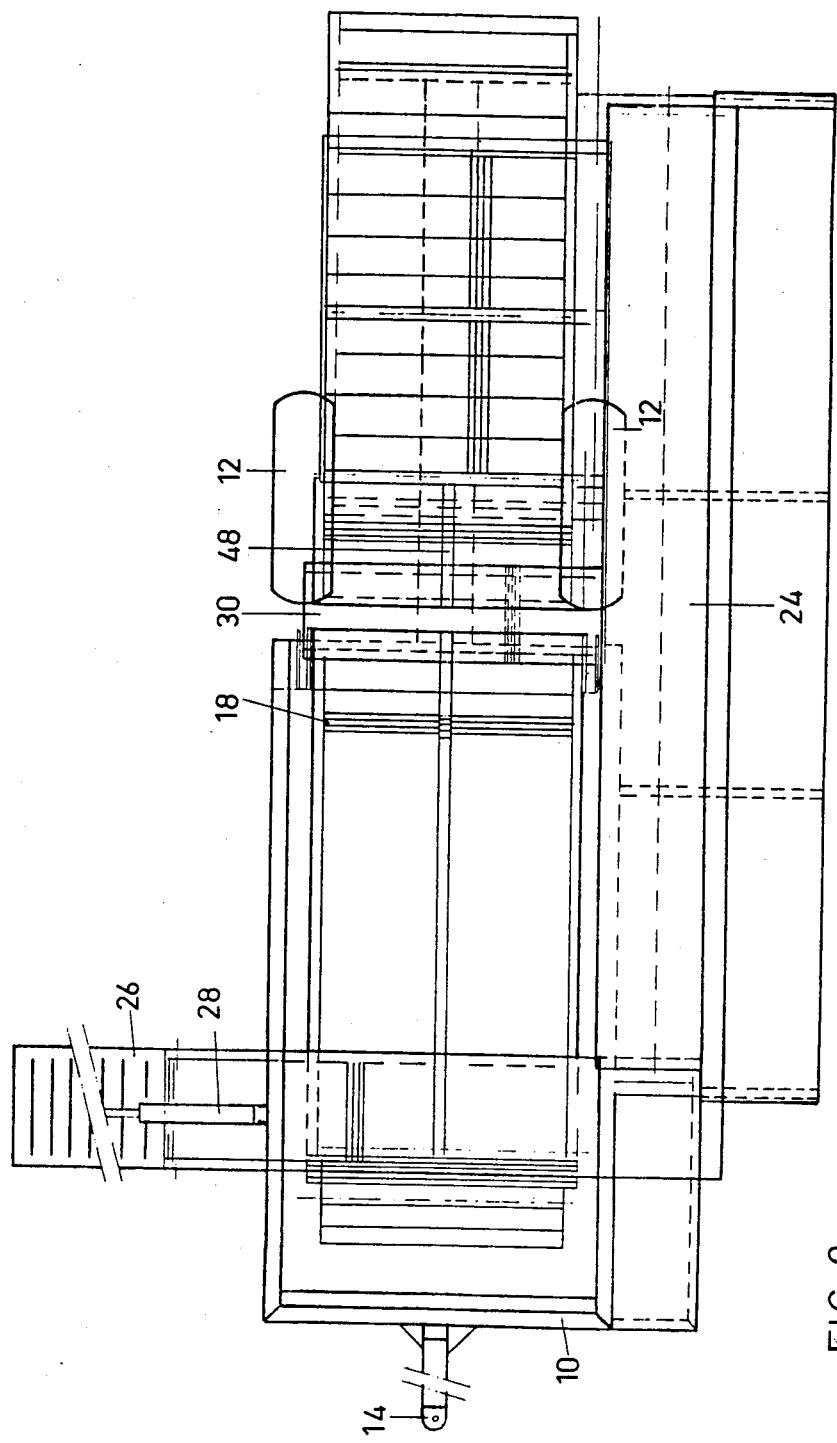
FIG. 2 is a top view illustration of the harvester of FIG. 1.
Figure 3:
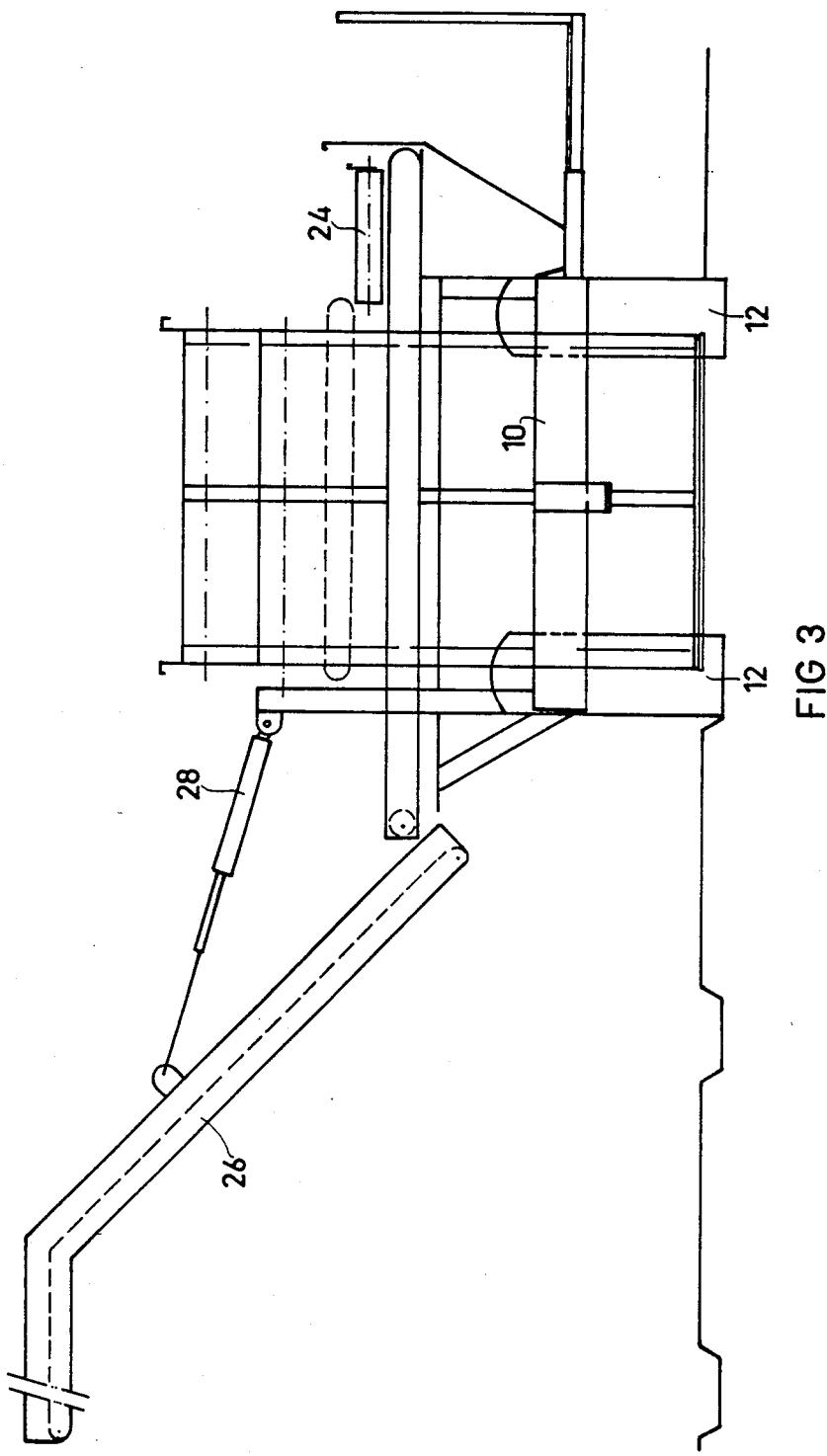
FIG. 3 is a front view illustration of the harvester of FIGS. 1 and 2.

Referring now to FIGS. 1-3 there is seen harvesting apparatus constructed and operative in accordance with an embodiment of the present invention comprising a chassis 10 which is mounted on a pair of support wheels 12 and which is designed to be drawn by a tractor and coupled thereto by means of a hitch 14. The harvesting apparatus is driven by the tractor power take off.

Growing plants such as tomato plants bearing produce are separated from the ground by a pair of rotating rods of square cross section 16 and raised by an inclined pickup conveyor 18. According to a preferred embodiment of the invention the cross-sectional dimensions of the rods are 38×38 mm and they rotate in a clockwise sense as illustrated here and are separated at their centers by a distance of 7 cm.

It is desired that the rods 16 be maintained during operation at a depth of 2-3 cm in the soil. In accordance with a preferred embodiment of the present invention automatic level maintenance apparatus is provided for maintaining the desired depth of rods 16. This apparatus is illustrated in detail in FIG. 8.

Referring now to FIG. 8 there is seen automatic level maintenance apparatus comprising a wheel or roller 101 which is pivotably mounted, as by a parallelogram arrangement onto inclined conveyor 18. A sensor 103 mounted onto the housing of the inclined conveyor senses the relative height of the wheel or roller 101 with respect to the inclined conveyor.

According to the illustrated embodiment, the sensor 103 is a hydraulic selector which operates a hydraulic cylinder and piston combination 105. The hydraulic cylinder and piston combination positions the inclined conveyor and particularly the rods 16 at a desired height relative to chassis 10, so as to maintain the rods at a desired depth in the soil, whose level is sensed by wheel or roller 101 which travels on the planting bed. A hydraulic piston and cylinder combination 107 is employed for predetermined adjustment of the incline of the inclined pickup conveyor 18 about a pivot axis 19 defined with respect to the chassis 10.

The above-described arrangement is particularly useful because the wheels of the harvesting apparatus travel in the furrows whose depth with respect to the soil surface underlying the growing plants is not necessarily constant. Therefore wheel 101 is provided for sensing the actual height of the soil surface.

Conveyor 18 supplies the agricultural material, including plants and produce to be separated therefrom, to separation conveyor apparatus 20, which will be described in greater detail hereinafter in connection with FIGS. 4 and 5. Produce separated from the remainder of the agricultural material falls onto a transverse produce conveyor 22, which feeds the produce onto a side produce conveyor 24. Conveyor 24 feeds the produce onto a produce loading conveyor 26 which raises the produce by a selectable amount determined by a hydraulic cylinder 28, for loading into a suitable container (not shown).

Refuse which falls during transfer of the agricultural material from conveyor 18 to separation conveyor apparatus 20, which may be clods of earth, stones or separated produce, is removed by a transverse conveyor 30. The side produce conveyor 24 provides an opportunity for manual sorting and examination of the produce before loading.

Figure 4:
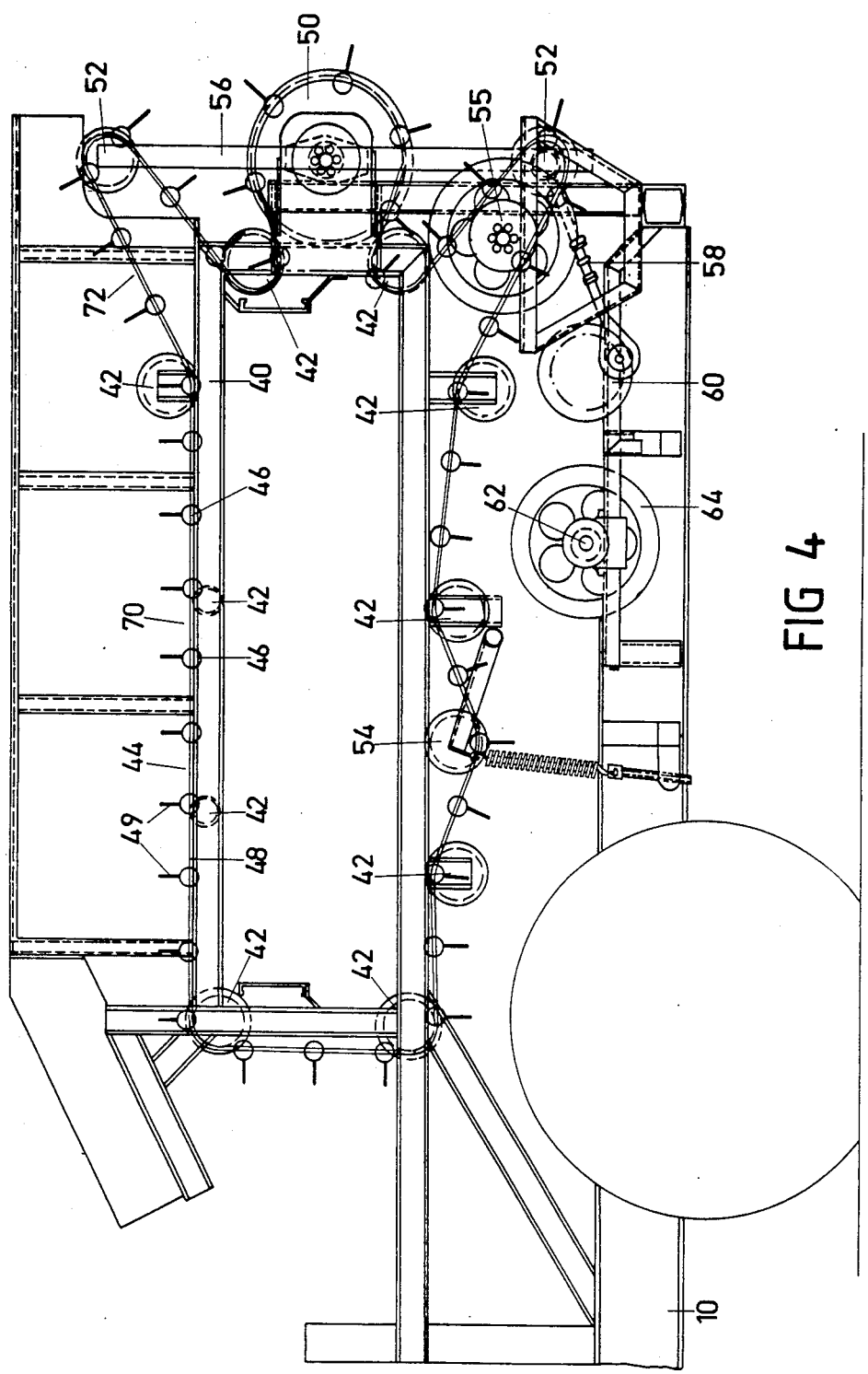
FIG. 4 is a detailed side sectional illustration of produce separation apparatus constructed and operative in accordance with a preferred embodiment of the invention.

Reference is now made additionally to FIG. 4 which is a detailed sectional illustration of the separation conveyor apparatus 20. The separation conveyor apparatus 20 comprises a fixed conveyor support chassis 40 which is fixed with chassis 10 and onto which are rotatably mounted a plurality of conveyor support wheels 42. A conveyor 44, comprises a plurality of spaced rods 46 which are coupled by flexible bands 48 at the extreme ends of the rods and preferably also at locations intermediate the ends. Attached to each of the rods are upstanding fingers 49 which aid in holding the agricultural material onto the rods and imparting a desired vibration amplitude thereto. It is appreciated that alternatively any other suitable type of conveyor may be employed, provided that it defines openings of sufficient number and size to permit the produce being separated to fall therethrough for collection.

In addition to fixed support wheels 42 there is also provided in engagement with the conveyor a drive wheel 50 of relatively large cross section for providing forward movement of the conveyor in a clockwise direction about wheel 50. Wheel 50 may be of any suitable construction and may be formed with an outer conditioned surface defining ridges, for positive gear-like engagement with bands 48.

Drive wheel 50 is bearing mounted onto chassis 40 and is driven in turn via a belt or chain by a hydraulic motor 55 with associated flywheel. Alternatively, any other suitable driving means may be employed.

Vibratory motion is imparted to the conveyor by means of a pair of movable support wheels 52 which are mounted on a pivotably mounted support rod 56 which is bearing mounted onto support chassis 40. Support rod 56 is driven in vibratory motion by means of a drive rod 58 which is coupled to the edge of an eccentric drive wheel 60 which is also rotatably mounted onto chassis 40. Eccentric drive wheel 60 is in turn driven by a hydraulic motor 62 and associated fly wheel 64.

It is appreciated that vibratory motion of support rod 56 causes the conveyor to move backwards and forwards along its travel path. This type of vibratory motion may be readily distinguished from the motion of the entire conveyor support chassis 40, wherein the vibratory motion would not be along the travel path of the conveyor but entirely along a single axis.

It is a particular feature of the present invention that conveyor 44 defines a produce separation pathway along which agricultural material travels in engagement therewith and which includes first and second portions which are angled with respect to each other. In the illustrated embodiment the produce separation pathway comprises an initial horizontal portion 70 at the beginning of which agricultural material falls thereonto from conveyor 18 and a final upwardly slanted portion 72 just prior to disengagement of the agricultural material from the conveyor. The provision of portions of the produce separation pathway in two different directions provides vibration of the agricultural materials in two different directions and in different planes which are angled with respect to each other. This, it has been found by experimentation, significantly enhances the efficiency of separation of produce from plants.

It is a particular feature of the present invention that since the forward motion and the vibration of the conveyor are produced by separate apparatus, the amplitude of vibration and the speed of forward motion can be separately and independently controlled. This is important in practice because different types and conditions of produce require different amplitudes of vibration and permit different rates of conveyor forward motion.

Figure 6A:
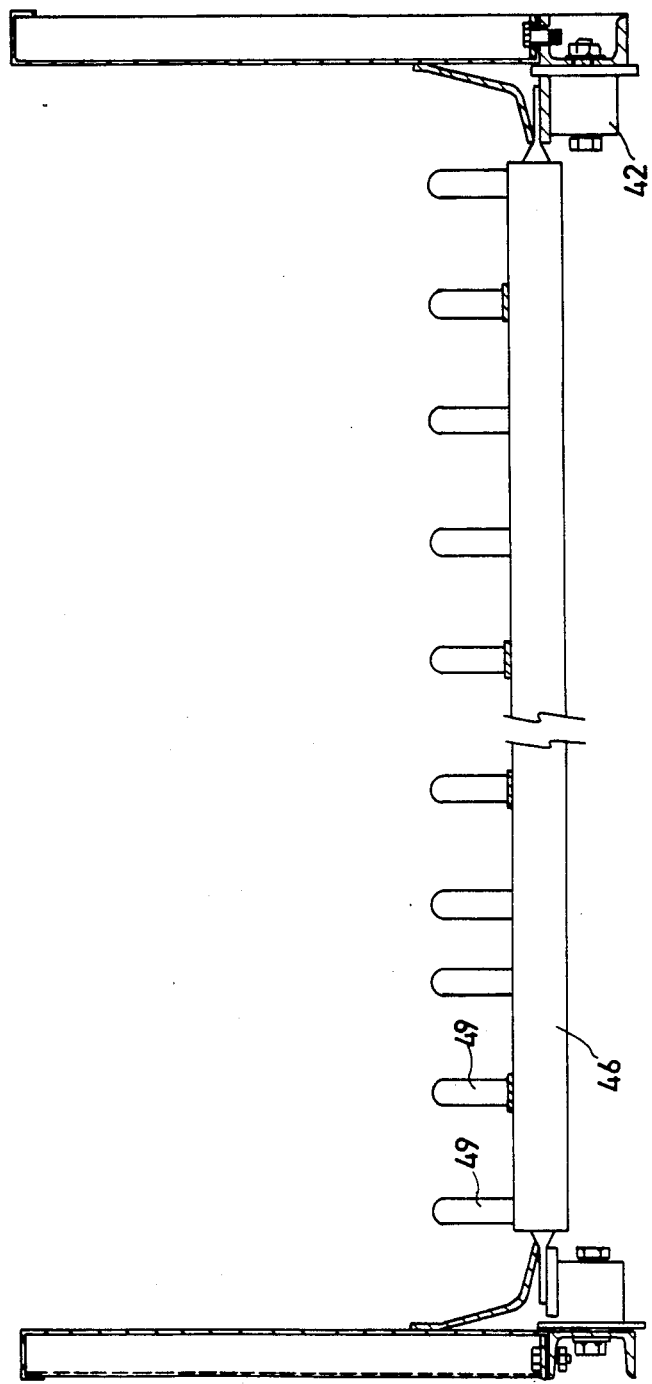
FIGS. 6A, 6B and 6C are illustrations of details of construction of the produce separation apparatus constructed and operative in accordance with the embodiment of FIGS. 4 and 5.
Figure 6B:
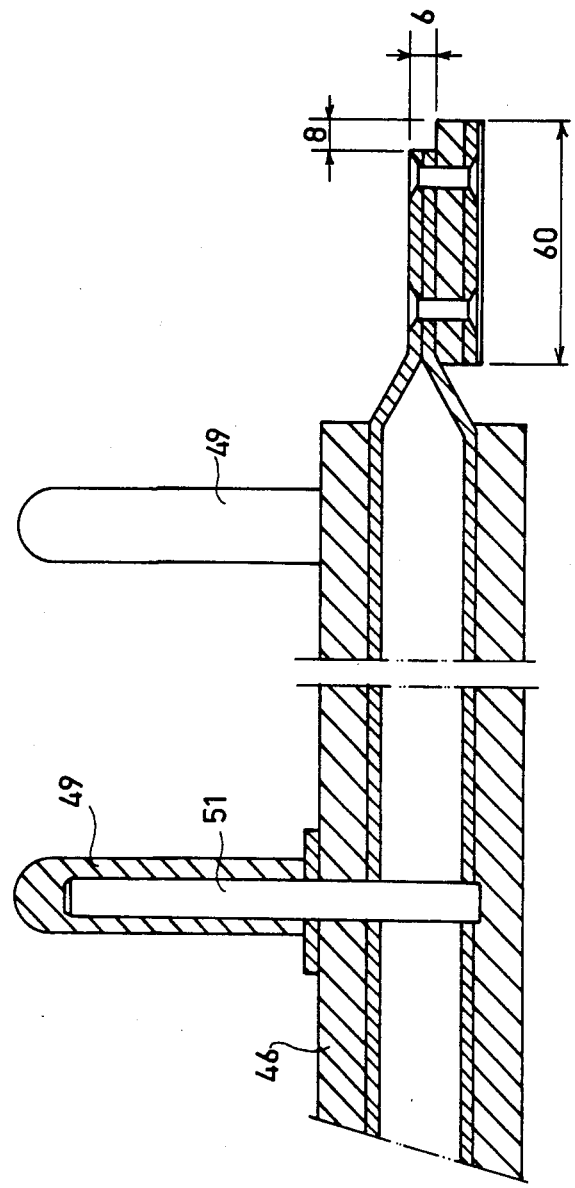
Figure 6C:
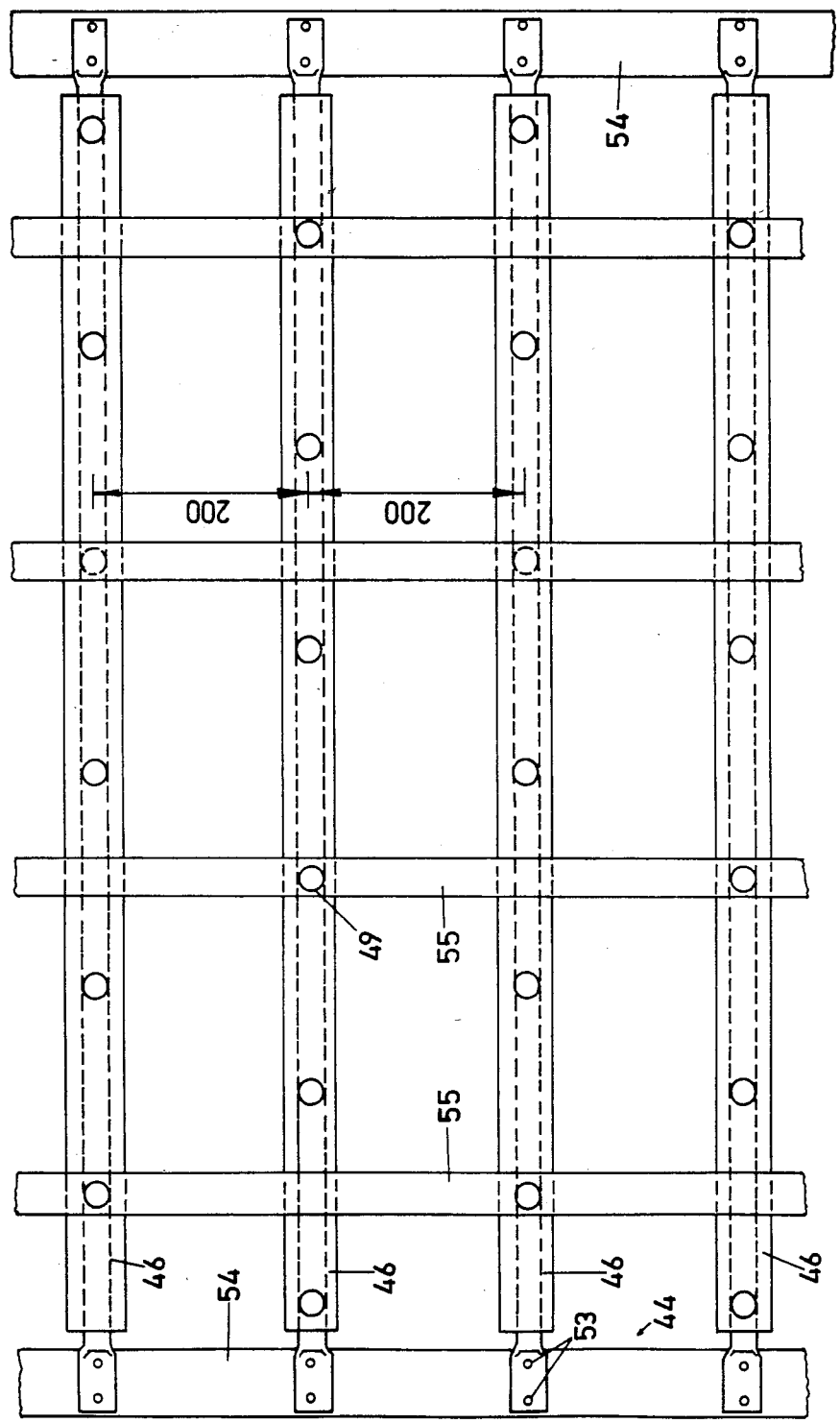

Reference is now aade to FIGS. 6A–6C which illustrate details of the construction of the produce separation apparatus of FIG. 4. FIG. 6A is a sectional illustration showing in side view a rod 46 of conveyor 44 and illustrates a plurality of upstanding plant engaging fingers 49. FIG. 6B, which is a detailed sectional illustration of a portion of rod 46 illustrates that the finger 49 comprises an interior supporting post 51 which extends entirely through rod 46. Both the supporting post 51 and the rod 46 are covered with a relatively thick coating of protective material such as rubber for absorbing impacts and reducing possible damage to the produce during operation of the produce separation apparatus.

FIG. 6C is a top view of a portion of the conveyor 44 and shows that rods 46 are mounted at their extreme ends as by rivets 53 onto drive belts 54. Arranged parallel to the drive belts there are provided a plurality of intermediate belts 55 which are engaged by fingers of alternating rods 46 as shown in detail in FIGS. 6A and 6B. These intermediate belts serve to define the open spaces between the rods so as to prevent plants from falling therebetween.

Reference is now made to FIGS. 7A and 7B which illustrate the construction of the inclined pickup conveyor. It is seen that the inclined pickup conveyor comprises a plurality of rods 119 mounted on three spaced drive bands 121, 123 and 125. The rods are typially spaced center to center by a distance of 3.6 centimeters and are attached at flattened portions thereof onto the drive bands. The rods may be arranged to lie alternatingly above and below the drive bands. Angled plant engaging fingers 127 are provided.

It is also a particular feature of the present invention that the inclined conveyor is disposed at approximately a 35° angle to the ground surface. This is a relatively steep disposition which aids in the compactness of the entire apparatus.

Figure 5:
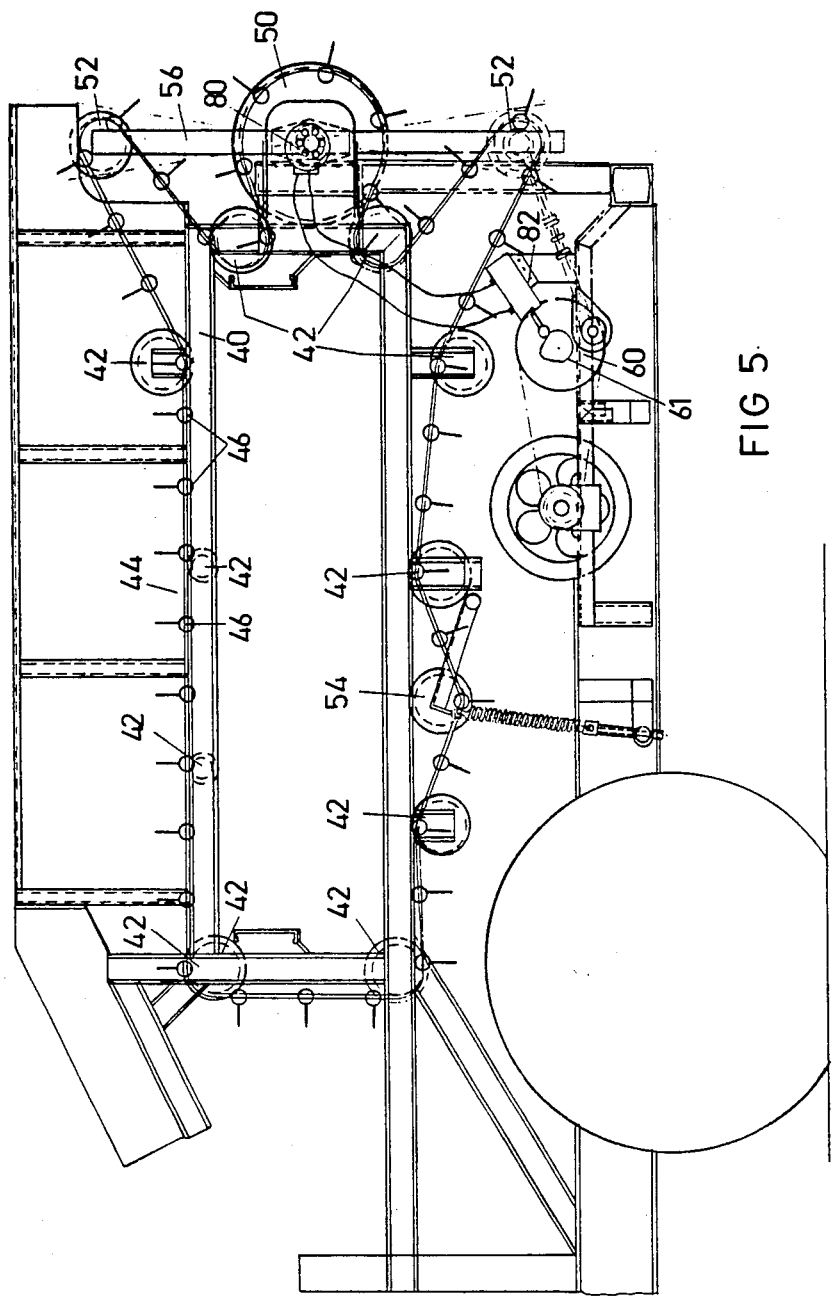
FIG. 5 is a detailed side sectional illustration of produce separation apparatus constructed and operative in accordance with an alternative embodiment of the invention.

Reference is now made to FIG. 5 which illustrates an alternative embodiment of separation conveyor apparatus. The separation conveyor apparatus of FIG. 5 is identical to that of FIG. 4 with the exception of the differences described hereinbelow. Identical components are indicated by the same reference numerals.

In the embodiment of FIG. 5, drive wheel 50 is operated by a motor 80 directly coupled thereto and which is operated by a switch sensor such as a hydraulic sensor associated with the eccentric drive wheel 60. Motor 80 is typically a hydraulic motor which is suitable for providing pulsed driving steps to wheel 50, such that wheel 50 rotates in a clockwise direction in a stepped rather than a continuous fashion.

Switch sensor 82, which is typically a hydraulic switch but may be alternatively any suitable mechanical, optical or electrical device, senses the provision of vibratory impulses to the conveyor by the eccentric drive wheel 60 and associated cam 61 and coordinates the operation of motor 80 such that the amplitude of vibration and the forward motion steps are additive in phase. Alternatively any other desired phase relationship may be provided and the phase relationship may be adjustable, as may be the relative amplitudes of the vibration and forward motion. Alternatively switch sensor 82 heed not actually sense the provision of vibratory impulses but may be synchronized therewith.

Reference is now made to FIG. 9, which shows harvesting apparatus constructed and operative in accordance with an alternative embodiment of the present invention. The differences between the embodiment of the invention described hereinabove and that illustrated in FIG. 9 may be seen readily by reference to FIG. 2 which has already been described.

In the embodiment of FIG. 2, the transverse conveyor 30 unloads onto a transverse conveyor 24, on which both separated produce and spurious matter such as clods of earth and rocks are located. The spurious matter is removed from the produce by manual methods by workers standing alongside side conveyor 24.

In the embodiment of FIG. 9, transverse conveyor 30 is moved in a direction opposite to its direction in the embodiment of FIG. 2 and unloads onto separation apparatus 200, which will be described hereinafter. The produce output from separation apparatus 200 is unloaded onto a second side conveyor 202 which is arranged for manual sorting. Side conveyor 202 unloads onto loading conveyor 26 downstream of conveyor 24.

It will be appreciated by persons skilled in the art that the invention is not limited to what has been particularly shown and described hereinabove. Rather the scope of the invention is defined only by the claims which follow.

We claim:

1. Apparatus for separating agricultural produce from plants comprising:
   conveyor means defining a produce separation pathway; and
   means for driving said conveyor means in vibratory motion in a first direction generally parallel to and along a first portion of said separation pathway and thereafter in vibratory motion in a second direction, angled with respect to said first direction, generally parallel to and along a second portion of said separation pathway, thereby to enhance separation of produce from agricultural material originally attached thereto;
   a produce receiving conveyor located directly beneath said separation pathway.

2. Apparatus according to claim 1 and wherein said means for driving said conveyor means in vibratory motion comprises:
   first means for driving said conveyor means in forward motion; and
   second means for driving said conveyor means in vibratory motion;
   said first and second means being controllable independently of each other for providing selectable forward motion and selectable amplitude of vibration of said conveyor means.

3. Apparatus according to claim 2 and wherein said conveyor means comprises an endless conveyor.

4. Apparatus according to claim 2 wherein said conveyor means comprises a plurality of spaced support elements arranged to permit produce to pass therebetween.

5. Apparatus according to claim 2 and also comprising plant loading apparatus for supplying produce bearing plants to said conveyor means, conveyor means for receiving produce separated from said plants and loading means for loading said produce into a receiving container.

6. Apparatus according to claim 1 and wherein said means for driving said conveyor means comprises means for driving said conveyor means in forward motion in phase with the vibratory motion thereof.

7. Apparatus according to claim 6 and wherein said means for driving said conveyor means in forward motion provides pulsed forward motion.

8. Apparatus according to claim 7 and also comprising vibratory motion sensing means providing an output to said means for driving said conveyor means in forward motion for controlling the operation thereof.

9. Apparatus according to claim 2 and also comprising pick-up and conveyor apparatus including a pair of adjacent rods of rectangular cross section which engage the plants below the soil surface.

10. Apparatus according to claim 9 and wherein said pick-up and conveyor apparatus is inclined at an angle of approximately 35 degrees.

11. Apparatus according to claim 9 and wherein said pick-up and conveyor apparatus also comprises means for maintaining a desired orientation with respect to the soil surface.

12. Apparatus according to claim 9 and wherein said pick-up and conveyor apparatus comprises an array of spaced metal rods mounted on spaced rubberized drive belts.

13. Apparatus according to claim 2 and wherein said conveyor means for recriving produce comprises spaced rubber coated rods defining a cushion.

* * * * *